Figure 1:
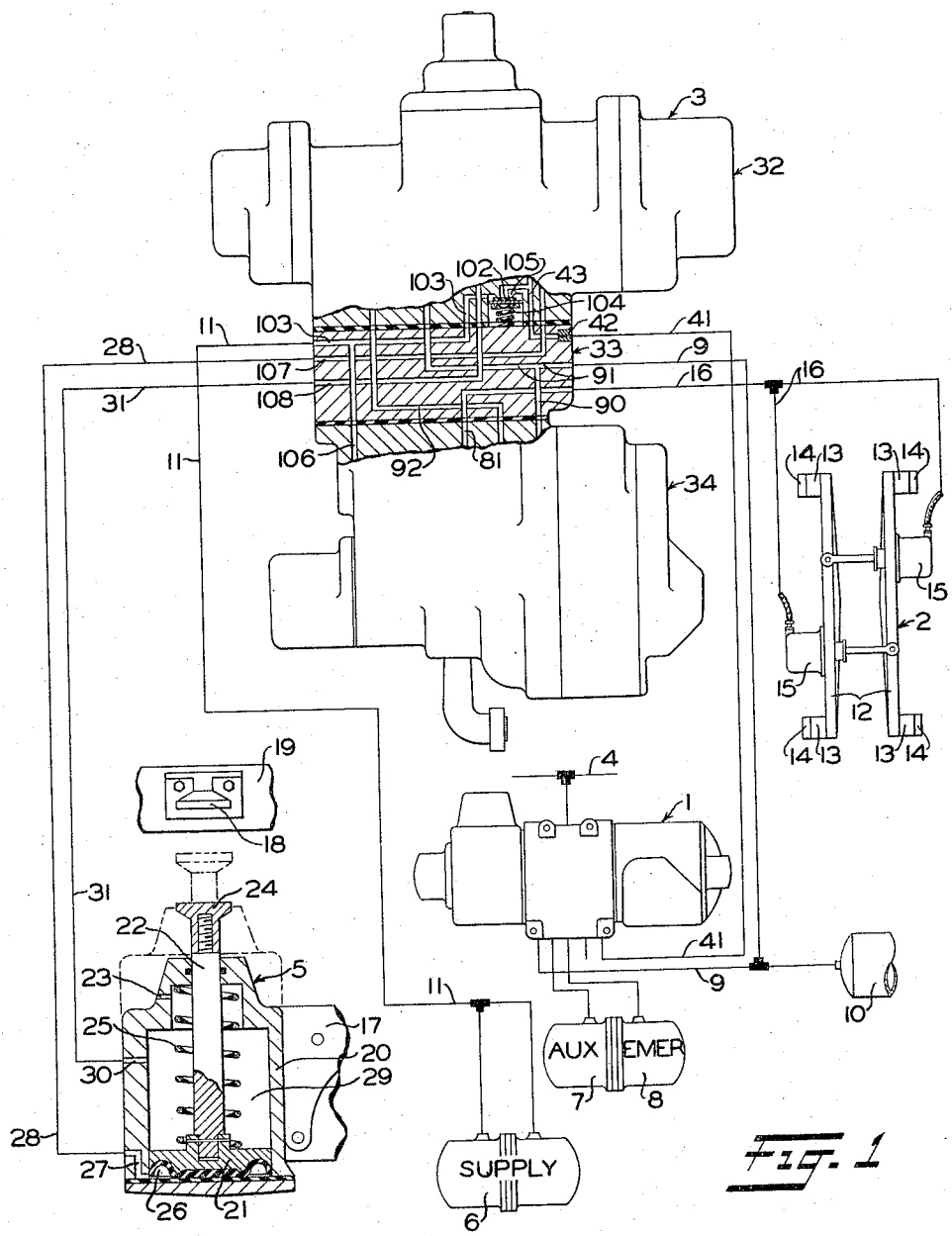

INVENTOR.
FRANCIS R. RACKI
BY
A. A. Steinmiller
ATTORNEY

United States Patent Office 3,300,255
Patented Jan. 24, 1967

3,300,255
FLUID PRESSURE BRAKE CONTROL APPARATUS WITH EMPTY AND LOAD CHANGE-OVER
Francis R. Racki, Pittsburgh, Pa., assignor to Westinghouse Air Brake Company, Wilmerding, Pa., a corporation of Pennsylvania
Filed Mar. 1, 1965, Ser. No. 436,039
9 Claims. (Cl. 303—22)

This invention relates to fluid pressure brake apparatus for railway vehicles, and, more particularly, to load-controlled fluid pressure brake apparatus.

Brake systems for railway vehicles employing change-over valve devices operate to compensate the braking action for load and empty conditions of a railway car. Such change-over valve devices, customarily employ differential type relay valves, having a plurality of diaphragms of different effective areas, in which the ratio of the delivery pressure to the control or pilot pressure can be varied in accordance with the area of the particular diaphragm or combination of diaphragms selected. However, a characteristic of differential relay valves used in empty and load change-over brake equipment is that the pressure supplied to the brake cylinders responsively to low control or pilot pressures, such as when an empty or no-load car condition prevails, may be insufficient to bring the brake shoes into contact with the tread of the car wheels. To correct this deficiency, inshot arrangements have been devised for causing the relay to provide an initial brake cylinder pressure such as 10 p.s.i., for example, to insure contact of the brake shoes with the wheel treads, regardless of the load condition of the car, the relay then being operative in cooperation with the change-over valve to automatically supply brake cylinder pressure, after the initial inshot, according to the load condition of the car.

It is an object of the invention, therefore, to provide a new and improved change-over valve device including a novel relay valve means of the differential diaphragm type, which functions automatically in response to initiation of a brake application, under empty or no-load condition of a railway car, to provide an initial one-to-one ratio of control pressure to brake cylinder pressure up to a certain brake cylinder pressure followed by a reduced ratio of control pressure to brake cylinder pressure, and, under a load condition of the railway car, a one-to-one ratio of control pressure to brake cylinder pressure throughout the brake application.

In accordance with the invention, the relay valve portion of the change-over valve device, which is operable responsively and in the usual manner to a load-measuring device for conditioning said relay valve portion for either a load or no-load condition, comprises a sectionalized casing having therein a differential piston in the form of two axially spaced diaphragms of different sizes, said diaphragms cooperating with the casing to define three chambers, that is, an intermediate chamber between the two diaphragms and two outer chambers adjacent the respective sides of said diaphragms opposite the sides adjacent said intermediate chambers. During a no-load condition, a spring disposed in the outer chamber adjacent the smaller of the two diaphragms acts on the smaller diaphragm to render it ineffective against pressurized control fluid supplied to the intermediate chamber, when a brake application is initiated, until such time that said control pressure is sufficient to overcome the spring effect. Until control pressure in the intermediate chamber, therefore, does overcome the spring effect, the larger diaphragm only is fully effective for opening a supply valve via which pressurized fluid is supplied to the brake cylinders to insure engagement of the brake shoes against the wheels. When the spring effect is overcome by control pressure in the intermediate chamber, the smaller diaphragm is displaced, and a lost-motion linkage interconnecting the two diaphragms becomes effective for causing the two diaphragms to operate as a unit to cause supply of brake-applying pressure to be proportionally reduced in relation to the control pressure as determined by the differential relationship of the areas of the two diaphragms. Under load conditions, the change-over valve device operates to cause fluid, at the same pressure as that supplied to the intermediate chamber, to be supplied to the outer chamber in which the spring is disposed, said fluid pressure in said outer chamber cooperating with said spring, therefore, to render the smaller diaphragm immobile against any degree of control pressure supplied to the intermediate chamber so that the larger piston is fully effective in causing the relay valve to supply brake-applying pressure on a one-to-one ratio up to any degree of control pressure.

Figure 2:
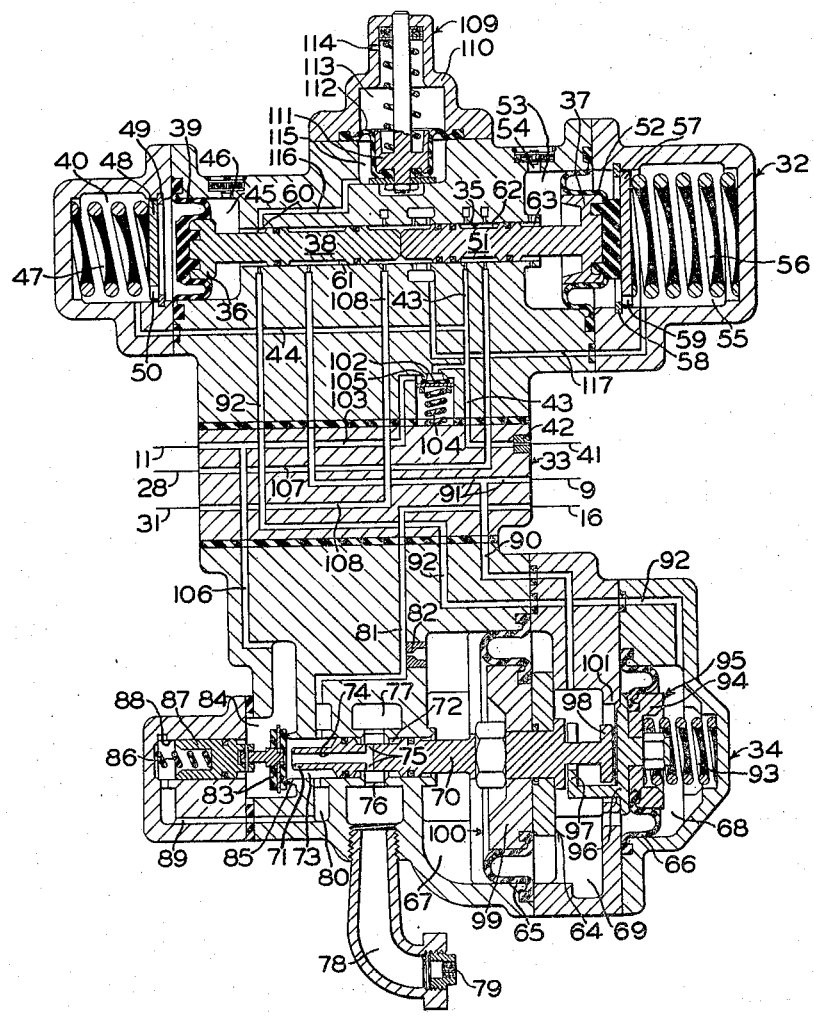

In the accompanying drawings:
FIG. 1 is a diagrammatic view, partly in section, showing a railway car brake equipment which includes a novel brake control apparatus for automatically controlling brake pressure according to the loaded or empty condition of a railway car.
FIG. 2 is a cross-sectional elevational view of the change-over valve device shown in FIG. 1.

As shown in FIG. 1 of the drawings, the fluid pressure brake equipment comprises a brake control valve device 1, brake means or brake rigging 2, a load change-over valve device 3, a brake pipe 4, a load measuring device 5, a supply reservoir 6, an auxiliary reservoir 7, and an emergency reservoir 8.

The brake control valve device 1 is of the usual well-known type which responds to the charging of the brake pipe 4 to charge the auxiliary reservoir 7 and emergency reservoir 8 in a manner well known and understood in the art, and which responds to a reduction in pressure in brake pipe 4 to direct pressurized fluid from the auxiliary reservoir 7 via a brake cylinder supply pipe 9 to an inlet connection in the load change-over valve device 3 for a braking application. The supply pipe 9 is also connected to a displacement volume reservoir 10 to compensate for the limited volume acted upon in the change-over valve device 3 by the pressurized fluid from the auxiliary reservoir 7 and emergency reservoir 8. A conduit 11 connects the supply reservoir 6 to a passageway in the change-over valve device 3.

The brake rigging 2 comprises a pair of brake beams 12 that normally extend crosswise of the railway car in parallel-spaced relationship to each other. The brake beams 12 are adapted to be movably supported at each end of the side frame members of a car truck, in a manner well understood in the art. Supported adjacent the outer ends of each brake beam 12 are brake heads 13 which carry brake shoes respectively for contact with the brake tread of an associated wheel. Each brake beam 12 has suitably rigidly secured thereto a brake cylinder 15 in which is reciprocably mounted a piston with a piston rod secured to the oppositely disposed brake beam 12, such that pressurization of the respective cylinder ends of each brake cylinder 15 causes the respective brake shoes 14 to contact the associated adjacent wheels for a braking application, in a manner well understood in the art. Pressurized fluid is supplied to the respective brake cylinders 15 via a conduit 16 connected to a passageway in the change-over valve device 3.

The load measuring device 5 (FIG. 1) is mounted on a suitable sprung portion of a railway car, such as the car truck bolster, by a bracket 17 substantially in line with a stop member 18. Stop member 18 is suitably mounted on a bracket 19, which bracket is suitably attached to an unsprung part of the car truck, such as the side frame of the car truck. Operative engagement between stop member 18 and the load measuring device 5 is effected in a manner to be presently described.

The load measuring device 5 comprises a vertically disposed strut cylinder 20, in which is slidably mounted a control piston 21 having a piston rod 22 extending through and slidably guided in the non-pressure head of the upper portion thereof. The upper end portion of strut cylinder 20, closely adjacent the nonpressure head, is vented to atmosphere via a port 23. The uppermost end portion of piston rod 22 has a stop member 24 adjustably mounted thereon for engagement with the stop member 18. A spring 25, encircling the piston rod 21, has its upper end seated on the upper end portion of strut cylinder 20 and its lowermost end engaging the piston 21, whereby said spring biases said piston to its lowermost position in the strut cylinder. A pressure chamber 26 at the lower end portion of strut cylinder 20, defined by the piston 21 and the lowermost end portion of cylinder 20, is connected via a passageway 27 to a conduit 28 for connection to the change-over valve device 3. A nonpressure or atmospheric chamber 29, at the upper end portion of strut cylinder 20, defined by the piston 21 and the upper end portion of strut cylinder 20 is connected via a passageway 30 to a conduit 31 for connection to the change-over valve device 3. In a loaded condition of a railway car, the stop member 24 is a greater distance from the stop member 18 than when the car is empty, since the stop member 24 is on the sprung portion of the railway car, and the springs supporting the sprung portion are compressed in accordance with the degree of loading on the sprung portion.

The term empty railway car designates an unloaded, partially loaded, or empty or no-load condition of a railway car such that upon pressurization of chamber 26, the upward movement of piston 21 is insufficient to establish communication between passageways 27 and 30; whereas a loaded railway car designates a car that is fully loaded or partially loaded such that upon pressurization of chamber 26, the upward movement of piston 21 is sufficient to establish communication between passageways 27 and 30.

The load change-over valve device 3 (FIG. 2) comprises a sectionalized casing having a change-over valve portion 32, a pipe bracket portion 33, and a relay valve portion 34.

Change-over valve portion 32 has a bore 35 extending longitudinally therethrough, having its respective end portions communicating with enlarged bore portions. The enlarged bore portions have motor pistons 36 and 37, respectively, therein with the adjacent ends of said motor pistons operatively connected together by stem portions, in a manner to be described.

Motor piston 36 has a stem portion 38 extending rearwardly therefrom and is slidably received by the bore 35. Motor piston 36 has a forwardly disposed portion which is suitably connected to a flexible diaphragm 39, the outer periphery of which is clamped between portions of the sectionalized casing of change-over valve device 3. The diaphragm 39 is subject on one side to the pressure of fluid in a control chamber 40 to which fluid under pressure is supplied from a charging pipe 41 via a choke 42, a passageway 43 and a branch passageway 44. In accordance with the usual practice, charging pipe 41 has one end constantly open to the brake pipe 4 through the brake control valve device 1 and the other end connected to passageway 43 to maintain control chamber 40 at brake pipe pressure. The other side of diaphragm 39 is subject to atmospheric pressure in a chamber 45 which is constantly open to atmosphere via a port 46. Chamber 40 houses a spring 47, which has one end seated on the inner end wall of said chamber and the other end abuttingly engaging a follower disc 48, thereby biasing said disc into engagement with the motor piston 36. Chamber 40 has an annular recess which receives an annular stop ring 49 which serves to limit the movement of follower disc 48 toward the motor piston 36, as illustrated in FIG. 2. Follower disc 48 is suitably recessed as at 50 to provide communication between the various portions of chamber 40 to assure equalization of pressure throughout said chamber.

Motor piston 37 has a stem portion 51 extending rearwardly therefrom and is slidably received by the bore 35, with the free end of said stem abuttingly engaging the free end of stem portion 38. Motor piston 37 has its forward portion suitably connected to a diaphragm 52, the outer periphery of which is suitably clamped between portions of the sectionalized casing of the change-over valve device 3. Diaphragm 52 is subject on one side to atmospheric pressure in a chamber 53 which is constantly open to atmosphere via a passageway 54 and on its opposite side to pressure in a chamber 55 which is subject to being pressurized by pressurized fluid from the brake pipe, in a manner to be described.

It is to be noted that the cross-sectional area of the motor piston 37 is greater than motor piston 36, such that when the brake pipe pressure is introduced into chambers 55 and 40, the total resultant force exerted on pistons 36 and 37 will move said pistons with their respective stem portions leftwardly, as viewed in FIG. 2.

Chamber 55 houses a spring 56 having one end seated on the inner wall surface of said chamber and the other end abuttingly engaging a follower disc 57 for biasing said follower disc into engagement with the motor piston 37. The chamber 55 has an annular recess which receives an annular stop ring 58 which limits the movement of follower disc 57 towards the motor piston 37. Follower disc 57 is suitably recessed or grooved as at 59 on its outer periphery to maintain fluid communication between all portions of chamber 55.

Stem 38 of motor piston 36 has a reduced end portion and a pair of annular grooves 60 and 61 to define a pair of spaced lands therebetween, which lands slidingly contact the inner wall surface of bore 35. Stem 51 of motor piston 37 similarly has a reduced end portion and a pair of spaced annular grooves 62 and 63 defining land portions therebetween, which land portions slidably engage the inner wall surface of the bore 35. The lands and grooves of stems 38 and 51 operate to cover and uncover ports, in a manner to be described.

Relay valve portion 34 houses a relay valve pistonvalve assemblage 64 comprising a pair of axially spaced diaphragms 65 and 66, which diaphragms have their respective outer peripheral edges clamped between portions of the sectionalized casing of the relay valve portion 34. Diaphragms 65 and 66 cooperate with the sectionalized casing to define a pair of spaced outer chambers 67, 68 and an intermediate or control chamber 69 therebetween. The one outer chamber 67 will be referred to hereinafter as the balancing chamber.

The piston-valve assemblage 64 has a stem 70 which has a reduced end portion 71 and an annular groove 72 on the intermediate portion thereof. The reduced end portion 71 of stem 70 cooperates with the inner wall surface of the bore, which receives said stem, to provide a clearance space 73 which communicates, via longitudinally extending bore 74 in the end portion of stem 70, with radially extending ports 75 which, in turn, communicate with the annular groove 72. In the normal position of the piston-valve assemblage 64, in which it is shown in FIG. 2, annular groove 72 is connected to atmosphere via radially disposed ports 76 and an annular cavity 77 opening to a vent pipe 78 which is provided at the end thereof with a strainer 79. The clearance space 73 is connected to the brake cylinders 15 via radially extending ports opening to an annular cavity 80, a passageway 81 and conduit 16 (FIGS. 1 and 2). The clearance space 73 is also connected to the balancing chamber 67 via passageway 81 and a choke 82. Thus, under normal conditions, the brake cylinders 15 and balancing chamber 67 are vented to atmosphere via the clearance space 73, bore 74, annular cavity 77 and vent pipe 78.

For controlling supply of fluid under pressure to and release thereof from the brake cylinders 15, a supply valve 83 is located in a chamber 84 wherein said supply valve is normally biased to a seated or closed position onto a seat 85 by a spring 86. Spring 86 has one end bearing against an end wall of a casing section of the sectionalized casing, and the other end bearing against a piston 87 connected to supply valve 83 for movement therewith. Piston 87 is slidably received in a bore 88 connected via a passageway 89 to annular cavity 80 and the clearance space 73 to maintain said bore at the same pressure as said clearance space. Under normal conditions, spring 86 maintains supply valve 83 in its seated or closed position on seat 85 since the piston-valve assemblage 64 is free of any fluid pressure effects.

According to the invention, intermediate or control chamber 69 is connected to the brake control valve device 1 via a passageway 90, a branch passageway 91 and supply pipe 9, while outer chamber 68 is connected via a passageway 92 to bore 35 of the change-over valve device 3 on the end adjacent piston 36, said passageway 91 also connecting to said bore and with groove 61 of piston stem 38.

A spring 93, disposed in outer chamber 68, is compressed between an outer casing wall of the relay valve and a diaphragm follower 94 to which the inner periphery of the diaphragm 66 is fastened to form a smaller diaphragm type piston 95. A lost-motion link 96 is removably secured at one end to piston 95 for movement therewith and has at its other end a forked portion 97 slidably straddling a flanged extension 98 of piston stem 70 in intermediate chamber 69. The inner periphery of diaphragm 65 is fastened to a diaphragm follower 99 to form a larger diaphragm type piston 100 removably secured at the end of stem 70 adjacent the flanged extension 98 on which the lost-motion link 97, as above noted, is slidably arranged to permit linked relative movement between the pistons 95 and 100, for a purpose to be hereinafter disclosed.

The spring 93 biases the smaller piston 95 toward a normal position defined by abutment of the portion of the lost-motion link 96 adjacent the follower 94 with an annular shoulder 101 formed in the casing. As long as smaller piston 95 remains in its normal position, larger piston 100 may move the length of the flanged extension 98 responsively to fluid pressure in chamber 69, without being affected by the smaller piston. The pre-load of spring 93 is so chosen as to require pressurization of chamber 69 to a predetermined minimum pressure, such as 10 p.s.i., for example, though not necessarily limited thereto, before displacement of piston 95 occurs. Thus, any pressurization of intermediate chamber 69 at such low control pressure up to 10 p.s.i. effects displacement of the larger piston 100 and, therefore, of piston-valve assemblage 64 leftwardly to an operating position in which supply valve 83 is operated to a supply position unseated from valve seat 85 and in which fluid at a corresponding pressure is supplied to the brake cylinders 15, in a manner to be more fully described hereinafter. Such a low pressure in said brake cylinders is sufficient to insure movement of the brake shoes 14 into contact with the associated treads of the wheels during minimum braking action.

In order to provide for the quick charging and recharging of the supply reservoir 6, load change-over valve device 3 connects the charging pipe 41 via passageway 43 through a one-way check valve 102 and a passageway 103 to conduit 11.

One-way check valve 102 is normally biased by a spring 104 into a seated position on a valve seat 105. Thus, as pressurized fluid flows into charging pipe 41, which is open to the brake pipe 4, such pressurized fluid flows via passageway 43, past check valve 102, through passageway 103 into conduit 11 for charging supply reservoir 6. The auxiliary reservoir 7 and emergency reservoir 8 are normally charged and recharged from the brake pipe 4 via brake control device 1, in conventional manner well known to those skilled in the art. Passageway 103 in change-over valve device 3 has a branch passageway 106 connecting conduit 11 with chamber 84 to condition the pressurization of the brake cylinders 15 upon unseating of supply valve 83, in a manner to be described.

A passageway 107 in change-over valve device 3 connects conduit 28 from the pressure chamber 26 in strut cylinder 20 to annular groove 62 on stem portion 51 of motor piston 37, and a passageway 108 connects conduit 31 from nonpressure chamber 29 in said strut cylinder to bore 35 between the reduced abutting ends of the piston stems 38 and 51, for a purpose to be described.

The uppermost central portion of change-over valve device 3, as viewed in FIG. 2, has a load-indicating means 109 comprising an inverted cup-shaped housing 110 suitably secured to the change-over valve portion 32. A movable abutment 110, having a resilient diaphragm 111, is located in the bore between change-over valve portion 32 and the cup-shaped housing 109 with the outer peripheral edge of diaphragm 111 clamped therebetween. Movable abutment 110 is subject on one side to the pressure in a chamber 112 which is vented to atmosphere via a port 113 and on the other side to the pressure in a chamber 114 which is connected via a passageway 115 to the left-hand portion of bore 35, as viewed in FIG. 2.

In the operation of the brake apparatus described, let it be assumed that an empty condition of a railway car is present. The strut cylinder 20 assumes a position relative to the unsprung portion of the railway car, such as bracket 19, that the stop member 24 will be relatively close to the stop member 18 since the car springs are not compressed as greatly as when the car is loaded. Upon pressurization of chamber 26 via conduit 28 (in a manner to be described), piston 21 will move upwardly in strut cylinder 20 only a limited amount due to engagement of stop member 24 by stop member 18, such that communication between passageways 27 and 30 remains blocked. In addition to an empty condition of the railway car, assume initially that the brake pipe 4 is charged to its normal pressure in well-known manner, and that the brake control valve device 1 responds to such charging of the brake pipe 4 to charge auxiliary reservoir 7 and emergency reservoir 8 with fluid at a pressure corresponding to that in the brake pipe.

Simultaneously with such action, pressurized fluid flows through the control valve device 1, charging pipe 41, passageway 43, annular groove 62 on stem 51, passageway 107 and conduit 28 to charge pressure chamber 26 of strut cylinder 20 in load measuring device 5. Since the railway car is in an empty condition in which the stop member 24 is relatively close to stop member 18, pressurization of chamber 26 produces no effects on the change-over valve device 3 since the upward movement of control piston 21 does not establish communication between passageways 27 and 30. Pressurized fluid flowing from charging pipe 41, in addition to flowing via passageway 43 into the annular groove 62, also flows via branch passageway 44 to pressurize control chamber 40 and to thereby cause movement of piston 36 and piston 37 rightwardly, as viewed in FIG. 2, to a no-load position to condition the change-over valve device 3 for operation during the no-load or empty condition. In such rightward movement of motor pistons 36 and 37, stems 38 and 51, of course, are also moved rightwardly therewith to a no-load position. In the no-load position of the pistons 36 and 37 and of the stems 38 and 51, communication between passageways 43 and 107 is cut off, and said passageway 107 is connected to atmosphere via chamber 53 and port 54 thereby venting chamber 26 in strut cylinder 20, since chamber 26 is connected via conduit 28, passageway 107, chamber 53, and port 54 to atmosphere. Spring 25 in strut cylinder 20 biases control piston 21 downwardly to disengage stop member 24 from stop member 18 to thereby restore the load measuring device 5 to an inactive position following such weighing operation. Restoration of stop member 24 to its normal spaced-apart relation with stop member 18, after the weighing operation has been completed, insures against possible damage to the load measuring device 5 while the car is in motion.

Pressurization of the supply reservoir 6 via check valve 102 during initial charging of the brake pipe 4 interconnects pressurized fluid from said supply reservoir via conduit 11, passageway 103 and branch passageway 106 to pressurize chamber 84 and thereby conditions the apparatus for braking operation, in a manner to be presently described.

When brake pipe pressure is reduced under operator control in the usual manner for causing a service brake application, brake control valve device 1 operates to supply fluid from auxiliary reservoir 7 to brake cylinder supply pipe 9 in the conventional manner and at a pressure corresponding to the degree of brake pipe reduction for the service application. Such pressurized fluid flows via supply pipe 9, passageway 91, and branch passageway 90 to pressurize intermediate chamber 69 for actuating piston-valve assemblage 64.

Upon initial pressurization of chamber 69, piston-valve assemblage 64 is moved leftwardly, as viewed in FIG. 1, until reduced end portion 71 of valve stem 70 contacts and unseats supply valve 83 to interconnect, via chamber 84, pressurized fluid from passageway 106 with the clearance space 73 provided between the wall of the bore which receives stem 70 and the reduced end portion 71 thereof, such that pressurized fluid flows via annular cavity 80, passageway 81, simultaneously to balancing chamber 67 via choke 82, and via conduit 16 to brake cylinders 15. It is to be noted that the balancing chamber 67 is supplied with pressurized fluid through choke 82 which assures the proper distribution of pressurized fluid to the brake cylinder devices 15 which are of relatively large capacity compared to the relatively small capacity of balancing chamber 67.

As was above noted, the value of spring 93 in chamber 68 is such that upon development of fluid pressure in chamber 69 in excess of 10 p.s.i., piston 95 moves rightwardly, as viewed in FIG. 2, until the forked portion 97 of the lost-motion link 96 makes abutting contact with the flanged end of extension 98 to thereby oppose the leftwardly directed action of piston 100. The degree to which the effectiveness of piston 100 is reduced by opposing action of piston 95 is determined by the relationship of the respective effective areas of the diaphragms 65 and 66 since the pressure of fluid in chamber 69, under a no-load condition, is equally effective on said diaphragms. Upon establishment of the minimum pressure of 10 p.s.i. in control chamber 69, any further reduction of brake pipe pressure thereafter results in pressurization of said control chamber, such that any further build-up of pressure in the brake cylinders 15 is done on the basis of the difference in the effective area of the large diaphragm 65 and that of the small diaphragm 66. Thus, by way of example, if the effective pressure area of the smaller diaphragm 66 is equivalent to 60% of the effective pressure area of the larger diaphragm 65, the resultant braking effect is equivalent to 40% of control pressure in control chamber 69, whereas during initial brake pipe reduction and until pressure in control chamber 69 attains 10 p.s.i., which is balanced by pressurization of balancing chamber 67 as above described, such balancing operation occurs on the common diaphragm 65 only until the pressure in said control chamber exceeds 10 p.s.i., and thereby effects a one-to-one braking ratio which assures bringing of the brake shoes 14 into contact with the treads of the wheels during a minimum braking application.

As was above noted, balancing chamber 67 is pressurized, via choke 82, simultaneously with supply of brake-applying fluid pressure to the brake cylinders 15 via passageway 81. Under a no-load condition, therefore, that is, with piston 100 operating at 40% effectiveness, when fluid pressure in balancing chamber 67, acting on the adjacent side of piston 100 in opposition to pressure in intermediate chamber 69, has attained a degree sufficient for balancing the effective pressure in said intermediate chamber (in this instance, 40% of the actual pressure), the piston-valve assemblage 64 is caused to move rightwardly, as viewed in FIG. 2, until supply valve 83 is reseated on valve seat 85 or to a lap position in which further supply of pressurized fluid to the brake cylinders 15 from chamber 84 is cut off. The piston-valve assemblage 64 thereafter operates in the well-known self-lapping manner to maintain pressure in the brake cylinders 15 according to the control pressure established in intermediate chamber 69.

In the event that a reduction in brake pipe pressure initiates an emergency brake application, a similar cycle is repeated wherein the brake control valve device 1 in well-known manner establishes communication from the auxiliary reservoir 7 and the emergency reservoir 8 to establish maximum control pressure in control chamber 69. Maximum pressurization of control chamber 69 effects unseating of supply valve 83 such that pressurized fluid, from the supply reservoir 6, flows via conduit 11, the clearance space 73, passageway 81 and conduit 16 to the respective brake cylinders 15 to effect a maximum brake application at the reduced ratio above described.

When the pressure in the brake pipe 4 is increased to thereby release the brakes, the brake cylinder supply pipe 9 is connected to atmosphere via control valve device 1, thereby connecting and venting control chamber 69, via passageway 90 and said conduit 9 to atmosphere also. With chamber 69 vented, venting of pressure in balancing chamber 67 is delayed by choke 82, such pressure, therefore, causing piston-valve assemblage 64 to be moved rightwardly, as viewed in FIG. 2, until reduced end portion 72 moves out of contact with supply valve 83. Such action releases the brakes, since the brake cylinders 15 are thereby connected via conduit 16, passageway 81 and annular cavity 80 to the clearance space 73 which is connected via longitudinally extending bore 74 in stem 70 to the annular groove 72 on the stem portion 70 which, in turn, is connected via annular cavity 77 and vent pipe 78 to atmosphere.

Assuming that the brake pipe 4 has been vented to below 10 p.s.i. or to atmosphere for emergency application of the brakes, the fluid pressure in charging pipe 41, passageway 43, branch passageway 44, as well as control chamber 40 will be vented to atmosphere, thereby subjecting stems 38 and 51 and motor pistons 36 and 37 to the forces of the respective springs 47 and 56 only which thereby center the stems 38 and 51 and the respective pistons into their neutral position or zone, as shown in FIG. 2. Upon recharging of the brake pipe 4 under these conditions, the load measuring device 5 operates to check the load or empty condition of the railway car. In the event the railway car is empty, the operation is as described above; however, if the railway car is loaded, the change-over valve device 3 is conditioned in a manner to be presently described.

It should be noted that the load measuring device 5 is actuated to register a loaded or empty condition of a railway car whenever an emergency brake pipe reduction has been effected, such that the stems 38 and 51 return to the neutral zone and are thus in position for directing fluid to the load measuring device 5. Assuming a neutral position of stems 38 and 51 and a loaded condition of a railway car, the position of the strut cylinder 20 relative to the unsprung portion 19 of the railway car is as shown in full lines in FIG. 1, wherein the stop member 24 on the movable piston rod 22 is in such position that upward movement of the stop member 24 relative to the stop member 18 uncovers passageway 30 to establish communication between passageways 27 and 30.

With a loaded car condition and the change-over valve device 3 in its neutral position, on charging of the brake pipe 4, pressurized fluid will flow from brake pipe 4 through the brake control valve device 1, via charging conduit 41 to the control chamber 40 and the load measuring device 5. Charging pipe 41 conducts the pressurized fluid via passageway 43, annular groove 62 in stem 51, passageway 107 and conduit 28 to chamber 26 in strut cylinder 20 to exert an upward force upon the control piston 21, thereby moving control piston 21 upwardly to establish communication between passageways 27 and 30. Such action permits the flow of pressurized fluid from chamber 26 in strut cylinder 20, via conduit 31 to passageway 108, and thence to bore 35 in the clearance space provided by the reduced end portions of the respective stems 38 and 51, through a passageway 117 to chamber 55 on the right-hand portion of change-over valve device 3. Pressurization of chamber 55 is opposed by the pressurization of control chamber 40 which is pressurized via passageways 44 and 43 from charging pipe 41. In that diaphragm 52 is larger than diaphragm 39, the differential force developed between the pressures acting in chambers 55 and 40 on the respective adjacent diaphragms 52 and 39 is such as to move the motor pistons 36 and 37, along with stems 38 and 51, leftwardly, as viewed in FIG. 2. Such leftward movement of stems 38 and 51 operates to block communication between passageways 43 and 107; however, communication is established between passageways 43 and 117 to thereby maintain pressurization of chamber 55 from the charging pipe 41 via passageways 43 and 117. Such leftward movement of stems 38 and 51 also establishes communication between passageways 91 and 92, for a purpose to be described, and also effects venting of chamber 26 in strut cylinder 20 to atmosphere since the annular groove 63 on stem 51 registers passageway 107 with chamber 53 which is vented to atmosphere via port 54. The compressed spring 25 in strut cylinder 20 operates to return control piston 21 downwardly to aid in the exhaustion of the pressurized fluid from control chamber 26. Chamber 29 in strut cylinder 20 is vented at atmosphere via port 23. In addition, port 23 vents conduit 31 upon movement of control piston 21 downwardly past passageway 30. The load measuring device 5 is thus locked out of operation until the brake pipe pressure is reduced to atmosphere which recenters the respective stems 38 and 51 in the neutral zone and in the manner described above.

During the charging of the brake pipe 4, brake control valve device 1 operates in the usual manner to recharge auxiliary reservoir 7 and emergency reservoir 8, and in addition thereto change-over valve device 3 operates to recharge the supply reservoir 6 through the one-way check valve 102 described above.

While the railway vehicle is in the loaded car condition, let it be assumed that brake pipe pressure is reduced under operator control in the usual manner for causing a service brake application. The brake control valve device 1 operates to supply fluid from auxiliary reservoir 7 to supply pipe 9, whence pressurized fluid flows via passageway 91 and passageway 90 to charge control chamber 69 in relay valve portion 34 at a pressure commensurate with the degree of brake pipe reduction. In addition, pressurized fluid from supply pipe 9 is conducted via passageway 91, annular groove 61 in stem 38 and passageway 92 to outer chamber 68 in relay valve portion 34 at the same pressure as that acting in control chamber 69 on one side of piston 95 to provide an opposing force acting on the opposite side of said piston, along with the force of spring 93, for maintaining said piston in its fixed position.

Of course, pressurization of control chamber 69 causes piston-valve assemblage 64 to be moved in a leftwardly direction, as viewed in FIG. 2, to unseat supply valve 83 so that pressurized fluid from the supply reservoir 6 is conducted via conduit 11 to passageways 103 and 106 and thence via chamber 84 to the clearance space 74, annular cavity 80 and passageway 81 for direction to the brake cylinders 15 via conduit 16 and to the balancing chamber 67 via choke 82. As was above described, when fluid pressure in the balancing chamber 67 is sufficient to balance fluid pressure in control chamber 69, an equalization of the net differential forces develops to cause supply valve 83 to be reseated and terminate any further increase in braking application. Thereafter, the piston valve assemblage 64 operates in a self-lapping manner for maintaining brake cylinder pressure according to control pressure prevailing in control chamber 69. A one-to-one ratio of brake application is thus provided since the effect of diaphragm 95 is cancelled out and the respective pressures acting in chambers 67 and 69 on opposite sides of diaphragm 65 are equal.

As was described above in connection with a no-load condition of the car, if the reduction in brake pipe pressure is such as to initiate an emergency brake application with a loaded car condition prevailing, the control valve device 1 operates to establish communication from both the auxiliary reservoir 7 and the emergency reservoir 8 to provide maximum control pressure in control chamber 69 and thereby effect a maximum brake application on a one-to-one ratio, the cycle of such operation otherwise being similar to that of a service application during a loaded car condition.

When the pressure in the brake pipe 4 is increased to release the brakes in a manner well known in the art, the brake cylinder supply pipe 9 is vented to atmosphere via brake control valve device 1 to thereby vent the brake cylinders 15 as well as chambers 69 and 67 of the relay valve portion 34 in the manner described above, it being recalled that venting of chamber 67 is delayed by the choke 82 to cause piston-valve assemblage 64 and, therefore, the reduced end 71 to be moved clear of supply valve 83 whereby venting may occur via vent pipe 78, as above described.

It will be understood that, while the brake control valve device 1 has been described above as of the direct application and release type, the brake control valve device may also be of the so-called graduated application and graduated release type wherewith varying degrees of service brake applications may be obtained.

Moreover, while the relay valve portion 34 disclosed in the present invention has particular utility with a change-over valve device, it should also be understood that such relay valve device can be utilized in other applications separate and apart from the change-over valve device.

Having now described the invention, what I claim as new and desire to secure by Letters Patent, is:

1. A load compensating brake system for a railway car comprising:
   (a) a brake pipe,
   (b) brake cylinder means for effecting a brake application,
   (c) a first source of fluid under pressure,
   (d) a second source of fluid under pressure,
   (e) conduit means,
   (f) brake control valve means responsive to a reduction of fluid pressure in said brake pipe to effect supply of pressurized fluid from said first source to said conduit means and responsive to subsequent increase of fluid pressure in said brake pipe to effect release of fluid pressure from said conduit means,
   (g) relay valve means including:
      (i) a casing,
      (ii) a pair of passageways, one of which is connected to said second source of fluid under pressure and the other of which is connected to said brake cylinder means, (iii) a valve member normally biased to a seated position connecting said one passageway to said other passageway of said pair and being operable to an unseated position connecting said one passageway to said other passageway, (iv) valve-operating piston means including a pair of axially-spaced pistons of different effective pressure areas and having a lost-motion connection therebetween, (v) said pistons cooperating with said casing to define a plurality of chambers including a control member chamber and an outer chamber, said control chamber being constantly open to said conduit means, one of said pistons being movable in one direction responsively to pressurization of said control chamber via said conduit means for effecting operation of said valve member to its said unseated position, the other of said pistons, which is interposed between said control chamber and said outer chamber, being movable out of a normal fixed position in a direction opposite to said one direction responsively to pressurization of said control chamber at a pressure in excess of a predetermined low pressure for reducing the effective force of fluid pressure in said control chamber acting on said one piston, to the extent permitted by said lost-motion connection and to a degree corresponding to the relationship of the respective effective areas of said pistons, (h) selector valve means operable to one position, in which communication between said outer chamber and said conduit means is cut off, and being operable to a different position in which communication between said outer chamber and said conduit means is open for pressurizing said outer chamber with fluid pressure acting on and effective for maintaining said other piston in its said fixed position notwithstanding the degree of pressure in said control chamber, and (i) means for effecting movement of said selector valve means to its said one position and its said different position.

2. A load compensating brake system for a railway car, as defined in claim 1, further characterized by a preloaded biasing spring disposed in said outer chamber for biasing said other piston to its said fixed position and for determining the pressure value required in said control chamber for effecting displacement of said other piston in the absence of conduit pressure in said outer chamber.

3. A load compensating brake system for a railway car, as defined in claim 1, wherein said plurality of chambers also includes a balancing chamber, said one piston being interposed between said balancing chamber and said control chamber, said balancing chamber being connected to the other of said pair of passageways for pressurization therefrom upon connection being effected between said pair of passageways, to balance effective fluid pressure active on said one piston in said control chamber for causing movement of said one piston in a direction opposite to said one direction and thereby effect restoration of said valve member to its said seated position.

4. A change-over valve device comprising:
(a) a casing,
(b) a fluid pressure inlet,
(c) relay valve means comprising:
(i) a valve member normally biased to a seated position and being operable to an unseated position in which communication is opened between a pair of passageways, one of which is adapted to be connected to a source of pressurized fluid, (ii) valve-operating piston means including a pair of axially-spaced pistons of different effective pressure areas and having a lost-motion connection therebetween, (iii) said pistons cooperating with said casing to define a plurality of pressure chambers including an outer chamber and a control chamber, the later being constantly open to said fluid pressure inlet, one of said pistons being movable in one direction responsively to pressurization of said control chamber from said fluid pressure inlet for effecting operation of said valve member to its said unseated position, the other of said pistons, which is common to both said outer chamber and said control chamber, being movable out of a fixed position in a direction opposite to said one direction to the extent permitted by said lost-motion connection responsively to fluid in said control chamber at a pressure in excess of a predetermined low pressure for reducing the effective force of fluid pressure in said control chamber acting on said one piston to a degree corresponding to the relationship of the respective effective pressure areas of said pistons, (d) selector valve means having one position, in which said outer chamber is cut off from said inlet connection, and being operable to a different position in which said outer chamber is placed in communication with said inlet connection for pressurization of said outer chamber for maintaining said other piston in its said fixed position notwithstanding the degree of pressure in said inlet connection relative to said predetermined low pressure, and (e) means for moving said selector valve means to its said one position and its said different position.

5. A change-over valve device, as defined in claim 4, further characterized by a preloaded biasing spring disposed in said outer chamber for biasing said other piston to its said fixed position and for determining the pressure value required in said control chamber for effecting displacement of said other piston in the absence of inlet pressure in said outer chamber.

6. A change-over valve device, as defined in claim 4, wherein said plurality of pressure chambers also includes a balancing chamber, said one piston being common to both said control chamber and said balancing chamber, said balancing chamber being connected to the other of said pair of passageways for pressurization therefrom upon opening of communication between said pair of passageways, to balance effective fluid pressure active on said one of said pistons in said control chamber for causing movement of said one piston in a direction opposite to said one direction and thereby effect reseating of said valve member to cut off communication between said pair of passageways.

7. A relay valve device comprising:
(a) a casing having formed therein:
(i) a control passageway via which control fluid pressure is admitted and released,
(ii) a supply passageway to which operating fluid pressure is supplied, and
(iii) a delivery passageway,
(b) a valve member normally biased to a closed position disconnecting said supply passageway and said delivery passageway and being operable to a supply position connecting said supply passageway and said delivery passageway,
(c) piston means for operating said valve member, said piston means comprising a first and a second piston of different pressure areas, respectively, axially spaced apart and having a lost-motion connection therebetween,
(d) said first and second pistons cooperating with said casing to define a plurality of chambers including an intermediate control chamber and an outer chamber, said control chamber being constantly connected to and chargeable with pressurized fluid from said control passageway, said outer chamber being optionally connected to said control passageway for being charged with fluid pressure therefrom or vented to atmosphere, (e) said first piston being axially movable in one direction responsively to pressurization of said control chamber with fluid pressure from the control passageway for effecting operation of said valve member to its said supply position, (f) said second piston interposed between said control chamber and said outer chamber, being axially movable responsively to the pressure of fluid in said control chamber exceeding a certain low value out of a normal fixed position in a direction opposite to said one direction for reducing the effective force of fluid pressure in said control chamber acting on said first piston to the extent permitted by said lost-motion connection and to a degree corresponding to the relationship of the respective effective pressure areas of said first and second pistons, said second piston being immobilized in its normal fixed position upon concurrent pressurization of said control chamber and said outer chamber from said control passageway, and thereby rendered ineffective to reduce the effective force of fluid pressure acting in said control chamber on said first piston.

8. A relay valve device, as defined in claim 7, further characterized by a pre-loaded spring disposed in said outer chamber for biasing said second piston to its said normal fixed position and for determining the pressure value required in said control chamber for effecting displacement of said second piston in the absence of pressure in said outer chamber.

9. A relay valve device, as defined in claim 7, wherein said plurality of chambers also includes a balancing chamber, said first piston being interposed between said balancing chamber and said control chamber, said balancing chamber being open to said delivery passageway for pressurization therefrom, upon operation of said valve member to its said supply position, to balance effective force of fluid pressure active on said first piston in said control chamber for causing movement of said first piston in a direction opposite to said one direction and thereby effecting restoration of said valve member to its said closed position.

References Cited by the Applicant
UNITED STATES PATENTS 3,136,588   6/1964   McClure.

EUGENE G. BOTZ, *Primary Examiner.*